No. 614,733. Patented Nov. 22, 1898.
W. LEUCKERT.
REFLECTOR FOR LAMPS.
(Application filed Apr. 2, 1898.)
(No Model.)
FIG. 1.
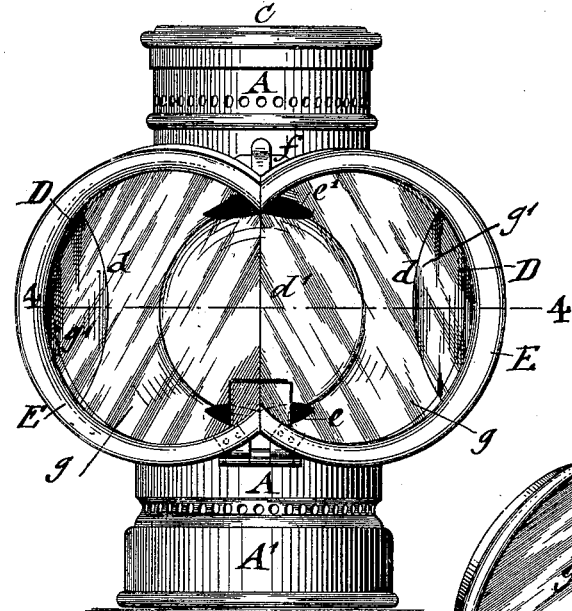
FIG. 2.
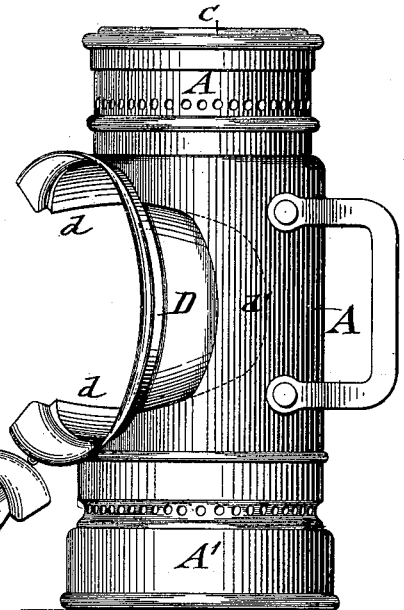
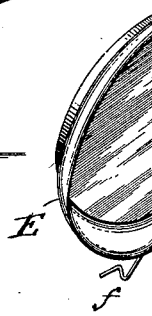
FIG. 3. FIG. 4.
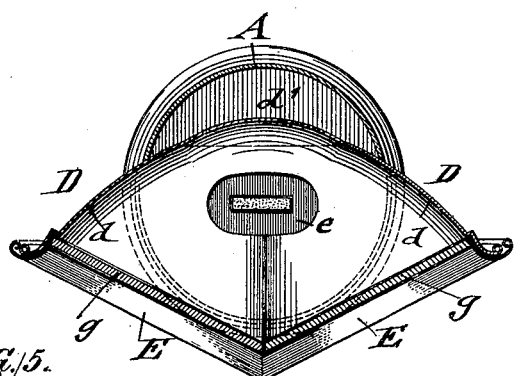
FIG. 5.
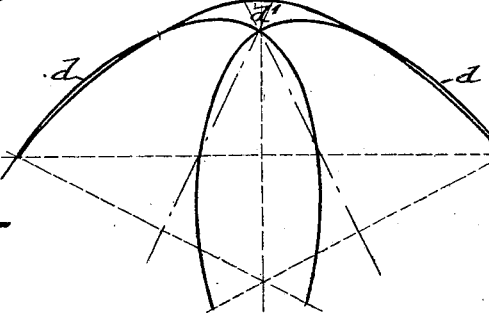
WITNESSES:
INVENTOR
William Leuckert
BY
Goepel & Raegener
ATTORNEYS.

UNITED STATES PATENT OFFICE.

WILLIAM LEUCKERT, OF NEW YORK, N. Y.

REFLECTOR FOR LAMPS.

SPECIFICATION forming part of Letters Patent No. 614,733, dated November 22, 1898.

Application filed April 2, 1898. Serial No. 676,164. (No model.)

*To all whom it may concern:*

Be it known that I, WILLIAM LEUCKERT, a citizen of the United States, residing in New York, in the borough of Brooklyn and State of New York, have invented certain new and useful Improvements in Reflectors for Bicycle and other Lamps, of which the following is a specification.

This invention relates to certain improvements in reflectors for bicycle and other lamps in which the greater portion of the light-rays are thrown forward in the direction of the axis of the lamp and the smaller portion of the light-rays are thrown sidewise at oblique angles of inclination to the vertical center plane of the lamp, so that not only a better illumination in front of the lamp, but also an effective illumination in lateral direction is obtained.

The invention consists of a reflector for bicycle and other lamps which is composed of two parabolic side sections and a parabolic center section, which connects the inner edges of the side portions.

The invention consists, further, of additional details of construction, which will be fully described hereinafter and finally pointed out in the claims.

In the accompanying drawings, Figure 1 represents a front elevation of a bicycle-lamp with my improved reflector. Fig. 2 is a side elevation of the same; Fig. 3, a plan view of Fig. 1, showing the glass front in lowered position; Fig. 4, a horizontal section on line 4 4, Fig. 1; and Fig. 5 is a diagram illustrating the construction of the reflector.

Similar letters of reference indicate corresponding parts.

Referring to the drawings, A represents the exterior casing or shell of a lamp for bicycles and other vehicles. The casing is made approximately in cylindrical shape and arranged in such a manner as to support in its lower part the fount of an oil-lamp A' or other source of light, the wick-tube of which is located transversely to the vertical center plane of the lamp. The upper part of the casing A is provided with a perforated chimney-cap C, through which the products of combustion are drawn off in the usual manner. The lower part of the casing is likewise perforated to permit the passage of the required quantity of air to the flame for keeping up combustion.

At the interior of the casing or shell A is arranged, back of the source of light, a reflector D, which is formed of two intersecting side sections $d\ d$ of parabolic shape and a center section $d'$, also of parabolic shape, said center section connecting the inner edges of the side sections $d\ d$. The side sections $d\ d$ form parts of symmetrical parabolas the axes of which intersect each other at an oblique angle and which are arranged symmetrically to the vertical center plane of the parabolic center section $d'$, as shown clearly in Fig. 5. The parabola of the center section $d'$ intersects the parabolic side sections and forms approximately a continuation at the side sections of the reflector for the purpose of taking up and reflecting the greater portion of the light-rays in forward direction, while a smaller portion of the light-rays is taken up by the side sections and reflected sidewise, so as to light up a greater area, which could not be done with the reflectors heretofore in use.

The reflector D can either be made of two separate parabolic side sections $d\ d$, that are soldered together at their line of intersection and from the central portion of which the parabolic center section $d'$ is hammered out, according to the pattern required, or the entire reflector may be stamped out of one integral piece by means of suitable dies, so as to form the parabolic intersecting side sections $d\ d$ and the connecting parabolic center section $d'$. In lamps of larger size, such as car and other lamps, the center section $d'$ may also be formed as an independent piece and screwed or otherwise attached to the intersecting side sections $d\ d$, but in smaller lamps, such as bicycle-lamps, it is preferable that the center section is formed as a part of the side sections or integrally with the same.

When the reflector is used with an oil-lamp, openings $e\ e'$ are arranged, respectively, in the bottom and top of the reflector, so that the supply of the air to the flame and the discharge of the products of combustion is kept up. The center and side sections of the reflector are so arranged that the center section throws the main body of the light-rays in forward direction, forming a round ball of light at the center, while the side sections throw the light-rays in lateral direction, so as to light up a wider area without impairing the body of light thrown in forward direction. The front edges of the intersecting side sections $d\ d$ and the front edges of the casing A are arranged at an obtuse forwardly-projecting angle with each other. The glass front or lid E of the lamp is made to conform to the angular shape of the reflector and casing, and is hinged at its lower part to the casing and locked at its upper part by any suitable fastening device $f$ to the same, as shown in Fig. 1. The frame of the hinged front or lid E supports the glass plates $g$ at the same angle of inclination as that formed by the side section and casing, the inner edges of the glass plates being ground off at a bevel, so as to abut one against the other, and provided at their outer parts with differently-colored portions $g'$, so as to provide for the required changing of colors in the side parts of the lamp. The hinged angular front or lid facilitates the cleaning of the interior surface of the reflector and fits tightly over the correspondingly-shaped front edge of the casing A, so as to prevent any ingress of air from the front to the interior of the lamp.

Having thus described my invention, I claim as new and desire to secure by Letters Patent—

1. A reflector for lamps, composed of two intersecting parabolic side sections, and a parabolic center section connecting the inner edges of the side sections, substantially as set forth.

2. A reflector for lamps, consisting of two side sections of parabolic shape, the axes of which intersect at an oblique angle with each other, and a center section also of parabolic shape connecting the inner edges of the side sections, substantially as set forth.

3. A reflector for lamps, consisting of two intersecting parabolic side sections, the axes of which intersect at an oblique angle with each other, and a parabolic center section connecting the inner edges of the side sections, the outer edges of the side sections being arranged at an obtuse, forwardly-projecting angle with each other, substantially as set forth.

4. The combination, in a bicycle or other lamp, of a casing, a reflector composed of intersecting parabolic side sections and a parabolic center section connecting said side sections, the outer edges of the reflector being arranged at an obtuse and forwardly-projecting angle to each other, and a front or lid composed of a frame and glass plates which are arranged at the same angle of inclination as the front edges of the reflectors, substantially as set forth.

5. The combination, in a bicycle or other lamp, of a casing, an interior reflector composed of two intersecting parabolic side sections and a parabolic center section connecting said side sections, the front edges of said casing and reflector being formed at an obtuse, forwardly-projecting angle, and a hinged front or lid composed of a frame and glass plates arranged at the same angle as the front edges of the casing and reflector and means for fastening the hinged front or lid to the casing, substantially as set forth.

In testimony that I claim the foregoing as my invention I have signed my name in presence of two subscribing witnesses.

WILLIAM LEUCKERT.

Witnesses:
PAUL GOEPEL,
G. W. JAEKEL.